United States Patent
Asinger et al.

[11] 3,888,923
[45] June 10, 1975

[54] PROCESS OF MAKING PENICILLAMINE

[75] Inventors: Friedrich Asinger, Aachen; Karl-Heinz Gluzek, Orsoy; Heribert Offermanns, Grossauheim, all of Germany

[73] Assignee: Deutsche Gold-und Silber-Scheideanstalt vormals Roessler, Frankfurt am Main, Germany

[22] Filed: Aug. 23, 1972

[21] Appl. No.: 283,233

[30] Foreign Application Priority Data
Aug. 24, 1971 Germany............................ 2142336

[52] U.S. Cl............................ 260/534 S; 260/481 R
[51] Int. Cl...................... C07c 101/20; C07c 99/00
[58] Field of Search........................ 260/534 S, 481

[56] References Cited
UNITED STATES PATENTS
2,480,079  8/1949  Hunter et al. .................... 260/534 S
FOREIGN PATENTS OR APPLICATIONS
853,236  10/1970  Canada............................ 260/534 S Primary Examiner—Lorraine A. Weinberger
Assistant Examiner—Richard D. Kelly
Attorney, Agent, or Firm—Michael S. Striker

[57] ABSTRACT

Penicillamine or a derivative thereof is made by starting from 2-isopropyl-5,5-dimethylthiazolidine of the formula

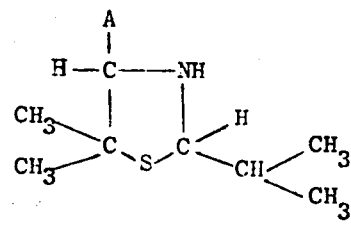

wherein A is an ester group having one to five carbon atoms in the alcohol moiety, a carboxylic amide or thiocarboxylic amide group or one of the latter two groups which is mono- or disubstituted by alkyl of one to six carbon atoms or phenyl or wherein A is a carboxyl group. The starting compound is reacted with a carbonyl reagent in the presence of water and of a water immiscible inert organic solvent and the two phases formed in the reaction are then separated and the penicillamine or its derivative is isolated from the aqueous phase.

18 Claims, No Drawings

PROCESS OF MAKING PENICILLAMINE

BACKGROUND OF THE INVENTION

The invention relates to a process for making penicillamine or derivatives or salts thereof by opening up the ring of 2-isopropyl-5,5-dimethylthiazolidine compounds.

5,5-dimethyl-thiazolidine-4-carboxylic acids or their alkyl esters, amides or salts which are disubstituted in the 2-position can rapidly be converted to penicillamine or its derivatives or salts by hydrolytic ring cleavage for instance by short heating with water. However, the 5,5-dimethyl-thiazolidine-4-carboxylic acids or their derivatives or salts which are monosubstituted in the 2-position are comparatively stable against hydrolytic ring cleavage (Zeitschrift fur Naturforschung 18b, 25, 1963).

It has already been proposed to form penicillamine by opening up the ring of 2-isopropyl-5,5-dimethyl-thiazolidin-4-carboxylic acid which is done by means of steam and elimination of an azeotropic mixture of water and the formed isobutyraldehyde. However, to obtain a quantitative conversion of the 2-isopropyl-5,5-dimethyl-thiazolidine-4-carboxylic acid, rather large amounts of steam and comparatively long reaction times are necessary. For instance to obtain a quantitative cleavage of the ring and conversion of one mol of 2-isopropyl-5,5-dimethyl-thiazolidine-4-carboxylic acid, about 20 to 30 l water must be distilled off (Belgian Pat. No. 738,520).

SUMMARY OF THE INVENTION

The present invention resides in a process wherein the thiazolidine compound is reacted with a carbonyl reagent in the presence of water and of a water immiscible inert solvent whereby two phases are formed which are then separated. The penicillamine or its derivative or salts can readily be isolated from the aqueous phase.

The starting compound for this process is a 2-isopropyl-5,5-dimethyl-thiazolidine or a salt thereof formed with a mineral acid. The starting compound has the following formula:

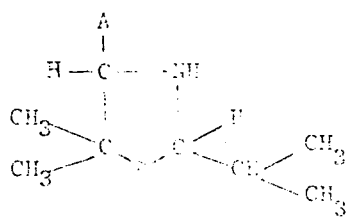

In this formula A is an ester group of one to five carbon atoms, a carboxyl amide group or thiocarboxylamide group or one of these latter two groups which is mono- or disubstituted by alkyl of one to six carbon atoms or phenyl or wherein A preferably is a carboxyl group.

DETAILS OF THE INVENTION AND OF PREFERRED EMBODIMENTS

Preferably a partial ring opening is effected before the reaction with the carbonyl reagent takes place by subjecting the starting product to steam distillation. This preceding partial ring opening should involve a maximum of 90% of the starting compound and preferably from 60 to 80%.

It is noted that is not necessary to have pure thiazolidines as the starting product. The reaction may also start from mixtures with inorganic salts, for instance ammonium salts as there are obtained in the hydrolysis of 2-isopropyl-5,5-dimethylthiazolidine-4-nitrile to form carboxylic acids. The mineral salts of the 2-isopropyl-5,5-dimethyl-thiazolidine compounds include the hydrohalides and particularly hydrogen chloride.

The carbonyl reagents used in this invention may be any of the compounds listed for instance in the textbook on organic chemistry by L. F. Fieser and M. Fieser, page 510 of the German edition of 1965. Also the salts and hydrates of these compounds may be used. The preferred compounds are hydrazine, phenylhydrazine, 2,4-dinitrophenylhydrazine, semicarbazide, thiosemicarbazide and hydroxylamine.

Preferably the amounts of carbonyl reagent are between 1 and 2 mol and most preferably between 1 and 1.1 mol per mol of 2-isopropyl-5,5-dimethyl-thiazolidine-4-carboxylic acid.

As indicated the reaction takes place in the presence of water. Preferably the water is employed in amounts of about 50 to 2,000 and most preferably between about 200 and 500 ml/mol of 2-isopropyl-5,5-dimethyl-thiazolidine-4-carboxylic acid. The organic solvent should be present in about the same amounts.

The ring cleavage by means of the carbonyl reagent can be effected at temperatures between 20°C and the particular boiling temperature of the reaction mixture. Preferably the temperature is between 40° and 80°C. The reaction time depends on the temperature and on specific carbonyl reagent. In general the time is between about 30 and 90 minutes.

As inert solvents which are immiscible with water and which are of an organic nature may be used for the reaction and for the extraction hydrocarbons particularly halogenated or aromatic hydrocarbons, ethers, etc.

The reaction preferably is carried out by reacting the aqueous solution of the 2-isopropyl-5,5-dimethyl-thiazolidine compound with the carbonyl reagent, which may be present in the form of a hydrate or salt in the presence of an organic solvent. The reaction mixture is subjected to vigorous stirring and may be heated and adjusted to a pH value which favors the formation of a condensation product from the isobutyraldehyde and carbonyl reagent. In general the pH should be between 1 and 7 which can be effected for instance by adding a base, particularly, NaOH or an alkali acetate.

More specifically the pH should be as follows in connection with the following carbonyl reagents:

| Hydroxylamine | 6 to 7 |
| Semicarbazide and Thiosemicarbazide | 4 to 5 |
| Phenylhydrazine | 3 to 4 |
| 2,4-dinitrophenyl hydrazine | 1 to 2 |

After completion of the reaction the phases formed are subjected to separation. From the organic phase the condensation product of isobutraldehyde and the carbonyl compound is recovered. The carbonyl reagent can be recovered by conventional means; see "Methoden der Organischen Chemie," Vol. VII, part 1, page 474, 1954. From the aqueous phase the penicillamine or its derivative or salt can be obtained in conventional manner, for instance, by evaporation to dryness, separation of the organic salt by solvent extraction, etc. (Belgian Pat. No. 738,520).

The process can be carried out in batches or continuously, for instance, by using extraction columns.

The DL-penicillamine which is obtained can then be separated into its optical antipodes for instance by the brucine method. It is preferred in this case to convert the penicillamine first into a compound which is particularly adapted for the separation of the racemate. Preferred is for instance the conversion into an acyl derivative of the penicillamine or the 2,2-disubstituted-5,5-dimethylthiazolidine-4-carboxylic acid.

The following examples further illustrate the invention.

EXAMPLE 1

240 g (1 mol) of 2-isopropyl-5,5-dimethylthiazolidine-4-carboxylic acid. HCl and 70 g (1 mol) of hydroxylamine-HCl were dissolved in 1.5 l of distilled water. After addition of 1.5 l chloroform 80 g (2 mol) of solid NaOH were carefully added. The pH of the aqueous phase was 6 to 7. After 30 minutes heating at reflux and subsequent cooling to room temperature the phases were subjected to separation. The aqueous phase was twice washed with 300 ml, each, of chloroform after adding 100 ml concentrated hydrochloric acid and was then evaporated to dryness. There was obtained a mixture of penicillamine.HCl and NaCl. Penicillamine.HCl was extracted from the mixture by extraction with 500 ml absolute alcohol.

There were obtained 158 g (85% of the theoretical value) of penicillamine.HCl having a melting point of 144° to 146°C. The product contained only traces of NaCl.

EXAMPLE 2

The same process was carried out as in Example 1. However, the starting product was a mixture of 240 g (1 mol) of 2-isopropyl-5,5-dimethyl-thiazolidine-4-carboxylic acid .HCl and 20.6 g $NH_4Cl$ as it is obtained in the acidic saponification of 2-isopropyl-5,5-dimethyl-thiazolidine-4-nitrile. The mixture was then further processed as in Example 1. There was obtained a mixture of penicillamine .HCl, $NH_4Cl$ and NaCl from which the penicillamine.HCl was obtained by solvent extraction with 500 ml absolute alcohol. There were obtained 158 g (85% of the theoretical value) of penicillamine.HCl having a melting point of 144° to 146°C. The product contained traces of inorganic salts.

EXAMPLE 3

The same process was used as in Example 1. However, the type and amount of solvents, the amount of water and the reaction temperatures were varied. The pH of the aqueous solutions in all cases was 4 to 5. The extent of the ring breakage was determined by gas chromatographic determination of the isobutyraldoxime. The results appear from the following Tables.

TABLE 1

This Table illustrates the use of different solvents in the ring opening of 2-isopropyl-5,5-dimethylthiazolidine-4-carboxylic acid.HCl (0.1 mol) with hydroxylamine (0.1 mol) in a water/organic solvent system (300 ml each). The reaction time was 30 minutes.

| Solvent | Reaction Temperature | Degree of Ring Opening |
| --- | --- | --- |
| $CH_2Cl_2$ | 39°C | 88 % |
| $CHCl_3$ | 56°C | 91 % |
| $C_6H_6$ | 71°C | 82 % |

TABLE 2

In this Table different amounts of water were used in the opening of the ring of 2-isopropyl-5,5-dimethylthiazolidine-4-carboxylic acid.HCl (0.1 mol) with hydroxyl amine (0.1 mol) while using chloroform (300 ml) as solvent. The reaction time was 30 minutes and the reaction temperature 56°C.

| Amount of Water | Degree of Ring Opening |
| --- | --- |
| 400 ml | 88 % |
| 300 ml | 91 % |
| 200 ml | 87 % |

EXAMPLE 4

A mixture of 240 g (1 mol) of 2-isopropyl-5,5-dimethyl-thiazolidine-4-carboxylic acid.HCl, 112 g (1 mol) semicarbazide.HCl and 164 g (2 mol) of sodium acetate and 1,500 ml distilled water were set up. 1,500 ml chloroform were then introduced as the lower stratum into the mixture and the reaction mixture was heated under nitrogen to boiling point for 60 minutes. After cooling, the organic phase containing the isobutyraldehydesemicarbazone was separated. The aqueous phase was twice extracted with 200 ml, each, of chloroform.

After evaporation to dryness the penicillamine was obtained in admixture with inorganic salts. The penicillamine was heated in 300 ml distilled water for a short period of time to 50°C under a protective atmosphere and was then precipitated by cooling with ice. After drying over $P_2O_5$ 110 g of penicillamine were obtained. This was 75% of the theoretical value. The product had a melting point of 204° to 205°C.

EXAMPLE 5

The same process was used as in Example 4. However the carbonyl reagent was thiosemicarbazide HCl (128 g = 1 mol). The pH of the aqueous phase was 4 to 5. There were obtained 105 g = 72% of the theoretical value of penicillamine. The melting point was 203° to 205°C.

EXAMPLE 6

240 g (1 mol) of 2-isopropyl-5,5-dimethyl-thiazolidine-4-carboxylic acid.HCl and 120 g (1.1 mol) of phenylhydrazine were heated in mixture with 1.5 l distilled water and 1 liter of toluene for 60 minutes at reflux. The pH of the aqueous phase was about 3 to 4. After cooling to room temperature the phases were separated. The aqueous phase after adding 100 ml concentrated hydrochloric acid was washed again with 100 ml toluene and evaporated to dryness. There were obtained 190 g (100% of the theoretical value) of crude penicillamine.HCl which was dissolved in 1.5 l of 96% ethanol. The solution was adjusted to a pH of between 6 and 7 by means of triethylamine dissolved in ethanol. After a short time 132 g (90% of the theoretical value) of penicillamine separated out. The melting point was 205° to 207°C.

EXAMPLE 7

240 g (1 mol) of 2-isopropyl-5,5-dimethylthiazolidine-4-carboxylic acid.HCl were dissolved in 500 ml water and subjected to steam distillation under a nitrogen atmosphere. After collecting about 700 ml of the distillate, the contents of isobutyraldehyde and the corresponding amount of the penicillamine.HCl formed in the steam distillation were determined. About 60% of the compound initially present had been subjected to ring opening. To open up the remaining amount of 2-isopropyl-5,5-dimethyl-thiazolidine-4-carboxylic acid a process was employed as described in Example 6. 54 g (0.5 mol) phenylhydrazine and 500 ml toluene were employed for the reaction. There were obtained 126 g (86% of the theoretical value of penicillamine of a melting point between 203° and 205°C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the production of penicillamine from a 2-isopropyl-5,5-dimethylthiazolidine having the formula

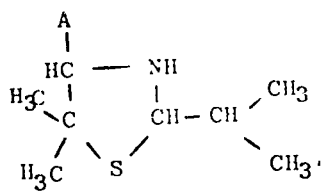

in which A is a radical of the group consisting of carboxy, alkoxycarbonyl radicals which contains up to five carbon atoms, carbamyl, thiocarbamyl, phenylcarbamyl, phenylthiocarbamyl and monoalkyl and dialkyl-substituted carbamyl and thiocarbamyl radicals, the alkyl moieties of which contain up to six carbon atoms, which comprises forming a pencillamine derivative having the formula

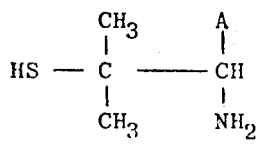

in which formula the radical A has the same significance as the foregoing A radical, by reacting the thiazolidine by heating an aqueous solution thereof together with an organic solvent that is immiscible with water and a reagent for the carbonyl group that reacts with isobutyraldehyde to form an oxime, hydrazone or semicarbazone therewith which oxime hydrazone or semicarbazone is insoluble in water but soluble in the organic solvent, the amount of the reagent for the carbonyl group being between 1 and 2 moles per mole of 2-isopropyl-5,5-dimethyl-thiazolidine, thereby cleaving the thiazolidine and forming an oxime, hydrazone or semicarbazone of isobutyraldehyde, separating the aqueous layer containing the penicillamine derivative from the water-immiscible layer containing the oxime, hydrazone or semicarbazone of isobutyraldehyde and subsequently converting the penicillamine derivative in the aqueous layer to penicillamine.

2. The process of claim 1 wherein the carbonyl reagent is selected from the group consisting of hydrazine, phenylhydrazine, 2,4-dinitrophenylhydrazine, semicarbazide, thiosemicarbazide, and hydroxylamine salts thereof.

3. The process of claim 2 wherein the reaction is carried out at a pH between 1 and 7.

4. The process of claim 2 wherein the pH is as follows:

| | |
|---|---|
| with hydroxylamine | 6 to 7 |
| with semicarbazide or thiosemicarbazide | 4 to 5 |
| with phenylhydrazine | 3 to 4 |
| with 2,4-dinitrophenyl hydrazine | 1 to 2. |

5. The process of claims 1 wherein the reaction is effected at a temperature between 20°C and the boiling point of the mixture.

6. The process of claim 5 wherein the reaction is effected at between about 40° and 80°C.

7. The process of claim 1 wherein the reaction is effected in an inert gas atmosphere.

8. The process of claim 1 wherein the phases are separated after extracting the aqueous phase with an inert organic solvent.

9. The process of claim 1 wherein the penicillamine is obtained in the form of a racemate followed by separating the racemate into its optical antipodes.

10. The process of claim 9 wherein the penicillamine obtained is first converted into its acyl derivative which is then separated into said optical antipodes.

11. The process of claim 1 wherein prior to reaction with said carbonyl reagent the starting product is first subjected to steam distillation until up to a maximum of 90% of the starting compound present has been cleaved.

12. The process of claim 11 wherein between 60 and 80% of the starting compound is cleaved in said steam distillation step.

13. The process of claim 1 wherein between 1 and 2 mol of the carbonyl reagent is employed per mol of 2-isopropyl-5,5-dimethyl-thiazolidine-4-carboxylic acid.

14. The process of claim 13 wherein the amount of said carbonyl reagent is between 1 and 1.1 mol.

15. The process of claim 1 wherein the reaction is effected in the presence of about 50 to 2,000 ml water and about the same amount of organic solvent per mol of 2-isopropyl-5,5-dimethyl-thiazolidine-4-carboxylic acid.

16. The process of claim 15 wherein the amount of water and organic solvent is between about 200 and 500 ml per mol of said carboxylic acid.

17. A process as defined in claim 1 in which the 2-isopropyl-5,5-dimethylthiazolidine is 2-isopropyl-5,5-dimethylthiazolidine-4-carboxylic acid hydrochloride.

18. A process as defined in claim 1 in which the organic solvent is a halogenated hydrocarbon, an aromatic hydrocarbon, or an ether.

* * * * *